Nov. 25, 1969  R. T. SULLIVAN  3,479,937
CAMERA APPARATUS FOR FITTING CORNEAL CONTACT LENSES
Filed July 20, 1967
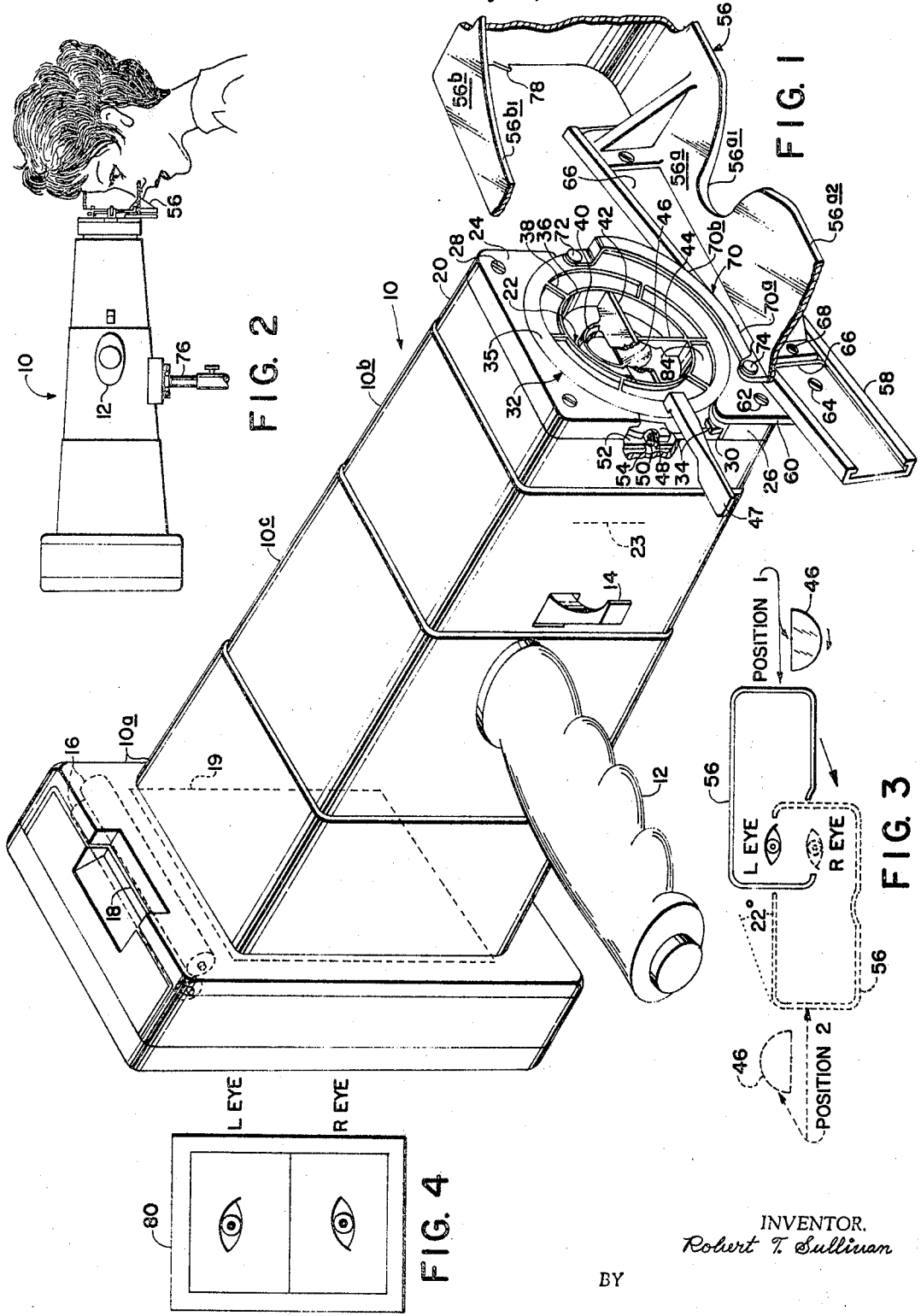
INVENTOR.
Robert T. Sullivan
BY
Brown and Mikulka
ATTORNEYS United States Patent Office 3,479,937
Patented Nov. 25, 1969

3,479,937
CAMERA APPARATUS FOR FITTING CORNEAL CONTACT LENSES
Robert T. Sullivan, Norwood, Mass., assignor to Polaroid Corporation, Cambridge, Mass., a corporation of Delaware
Filed July 20, 1967, Ser. No. 654,796
Int. Cl. G03b 19/04
U.S. Cl. 95—11                                        12 Claims

ABSTRACT OF THE DISCLOSURE

A photographic camera for use in fitting of corneal contact lenses to the human eye. The camera has a rotatable wheel element with an actuating handle attached thereto, an opaque semi-circular disk optically aligned with the objective aperture of the camera, and a facial supporting frame for spacing the eyes a given distance from the objective. The opaque disk is interconnected with the wheel element and is moved from a first position in which it blocks exposure of the lower half of a photosensitive sheet to a second position in which it blocks exposure of the other half of the sheet in response to rotation of the wheel element from a first to a second position. The facial supporting frame is slideably mounted in front of the objective and has a member for linking the support frame to the wheel element so that the frame is moved transverse to the objective axis in response to rotation of the wheel element to thereby align one of the eyes with the objective. The camera has an electronic flash and an ultraviolet transmitting filter for rendering the fluorescein in the subject's eyes to become visible and thereby enable the pattern formed between the contact lens and the corneal surface of both eyes to be recorded on corresponding halves of a photosensitive sheet.

In brief, the camera apparatus of the present invention may be termed a photographic exposure-control device of a type for incorporation with a short-range or so-called "close-up" camera. The camera includes compressive processing means for rapidly producing finished photographic prints, using a film pack, each unit of which embodies a releasable processing liquid. Such a camera is known as the "CU–5" Camera and is sold by Polaroid Corporation, Cambridge, Mass., U.S.A. The apparatus includes a facial positioning or support frame so contoured as to engage the cheek-bones, the forehead and the nose of the subject and an angularly-disposed guide for variably positioning the support frame at the front of the camera. The guide enables its translational movement in a vertical plane normal to the optical axis of the objective and at an acute angle relative to a horizontal plane intersecting the optical axis. An opaque semi-circular disk is mounted for rotation in the camera lens-aperture so that, alternately, when rotated 180°, it either passes or excludes the light of a photographic exposure relative to each half of the camera objective. Means are also provided for interlocking the disk and the facial support frame whereby rotation of the disk provides linear movement of the support frame to position the eyes sequentially at separate halves of the lens-aperture. At the same time, rotation of the opaque disk covers that half of the lens-aperture with which the eye is not then in alignment.

An ultraviolet flash exposure is made in succession for each fluorescein-treated eye and the images of the fluorescein patterns are recorded in visible light on vertically-separated portions of the film, as previously intimated. The compressive processing characteristics of the camera and film permit immediately obtaining finished photographic prints for rapid interpretation or detailed study of visibly-rendered patterns which reveal the relationship between the posterior contact lens surface and the anterior corneal surface. Employing, for example, a black-and-white film material, such as one having an ASA speed of 3000 which is commercially available for the aforesaid "CU–5" camera, and which, because of the small aperture and great depth of field permitted thereby, has certain advantages, the fluorescein pattern is recorded in the print in terms of differential image densities, the darker areas being those wherein conformance of the adjacent lens and corneal surface more closely exists. If a color film is employed, color-value differences in the print are informative, the lighter the color or its complete absence indicating a substantial contiguity of the surfaces.

In accordance with the foregoing considerations, objects of the invention are to provide relatively simple and easily-operated camera apparatus for use with ultraviolet illumination in fitting corneal contact lenses to the human eye; to provide camera apparatus, as indicated, which is adapted to utilize, sequentially, the upper and lower halves of the camera lens-aperture so as to form photographic images of each individual eye on upper and lower halves of a single sheet of photographic film material of given dimensions; to provide camera apparatus of the foregoing category which comprises a translationally-movable frame for moving and supporting the face of the subject to bring each eye, sucecssively, to a predetermined position relative to the lens-aperture; to provide camera apparatus, as described, which comprises a rotatable semi-circular disk positioned in the camera lens-aperture and linkage means interlocking with the aforesaid movable facial-supporting frame whereby manual movement of the disk to occupy opposite halves of the lens-aperture, as established by associated detent means, also moves the supporting frame to given related locations; to provide apparatus of the aforementioned type wherein the facial-supporting frame is controlled by a guide slidably mounted in an acutely angled channel or track fastened to the front of the camera; to provide camera apparatus, as defined, for photographing fluorescein patterns with a corneal contact lens on the human eye, the apparatus including a circular electronic flashtube surrounding the lens-aperture having an ultraviolet transmitting filter associated therewith for activating the fluorescein and also including an ultraviolet absorption filter positioned in the lens-aperture; and to provide camera apparatus of the character described adapted to produce finished photographic prints for immediate inspection concurrently with the formation of fluorescein patterns between the contact lens and cornea, wherein compressive processing means are incorporated in the camera back and film materials embodying a releasable processing liquid, rendered functional by the processing means are employed.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein:

FIGURE 1 is a diagrammatic perspective view of a short-range self-processing camera incorporating the apparatus of the invention;

FIG. 2 is a diagrammatic side view of the camera apparatus illustrating its usage with respect to the eyes of a person;

FIG. 3 is a diagrammatic front view of the facial support frame and the lens-aperture disk of the apparatus, illustrating their operation in performing a sequential exposure of each eye of the subject; and FIG. 4 is a diagrammatic front view of a photographic print produced by the camera apparatus of the invention and carrying images of both the left and right eyes of the subject, in vertical relation.

Referring now to the drawing, the close-up camera 10 of a separable multisectional type including the rear section 10a, the front section 10b and the intermediate section 10c, the latter serving merely as a ratio multiplier. A removable pistol-grip 12 and a trigger-type shutter-release 14 are provided. The rear section 10a is adapted to carry a film pack, each unit of which embodies a releasable processing liquid. A pair of pressure rolls 16 is mounted in the rear section adjacent to a slot 18, through which each film unit is manually drawn by a leader or tab thereof, after its photographic exposure, at a focal plane 19 to advance it between the pressure rolls and, thence, exteriorly of the camera. The pressure rolls serve to release and spread the processing liquid throughout the exposed emulsion and an image of the photographic subject is thus formed on a suitably-provided surface of the film unit by a diffusion transfer process. An example of such a process is described in U.S. Patent No. 2,543,181.

A frontal housing 20 is releasably fastened to the front section 10b. The frontal housing includes means providing a central bore or aperture at 22, termed herein the lens-aperture, leading to a lens, shutter and diaphragm assembly, not shown in detail but located laterally inwardly of the dotted line 23, namely, in the forward portion of the section 10b. The frontal housing 20 also includes an annular aperture surrounding the wall of the central bore for transmitting the rays from a flashtube, as explained below. The terms "front" and "rear," or their equivalents, relate to proximity to or remoteness from the front of the camera; the terms "upper," "lower," etc., refer to top or bottom locations with the camera positioned as shown in FIGURE 1.

For purposes of the present invention, the lens may be considered as a four-element component of f/4.5 to f45 relative aperture, and of 75 mm. (3-inch) focal length, to provide a 2× magnification. This magnification is obtained in conjunction with a distance of approximately 9 inches from the nodal point of the lens to the film plane in section 10a, as provided by the three-sectionl assembly 10a, 10b and 10c, and a distance of about 4½ inches from the nodal point of the lens to the subject. A suitable lens, shutter and diaphragm assembly is a "Prontor Press" unit manufactured by Alfred Gauthier, G.m.b.H., Schwarzwald, Germany, incorporating a self-cocking shutter and a Tessar type "Rodenstock Ysaron" copy lens. The shutter speeds are 1 second to 1/125 second and "Bulb"; "X" synchronization.

Two identical retaining plates, namely, an upper plate 24 and a lower plate 26 composed, for example, of a plastic such as nylon, are fastened to the front surface of the frontal housing 20, as by the screws 28. Each retaining plate includes a curved or arcuate channel 30 formed in its inner face. The retaining plates 24 and 26 serve to mount a wheel 32 for rotation. The wheel 32 is preferably composed of a dull-finished black plastic such, for example, as the plastic "Delrin," sold by E. I. du Pont de Nemours Co., Wilmington, Del., U.S.A. The wheel 32 includes, as integral components thereof, a circular flange 34 extending substantially around its periphery in slidable contact with the channels 30; a frontal ring-like rim 35 which is approximately flush with the front surface of the retaining plates 24 and 26, a median ring 36 concentric with the rim 35 and depending from the latter by means of the spokes 38, an inner ring 40 connectric with the median ring 36 and depending therefrom through the instrumentality of the flat midsectional support 42 and the radial support 44. The inner ring 40 is to be understood as positioned rearwardly well within the lens-aperture 22 of frontal housing 20 and includes an integral semicircular opaque disk 46 which covers one-half of the opening thereof and, accordingly, one-half of the lens-aperture.

A handle 47 is attached to the rim 35 for manually rotating the wheel through 180°, as determined by detent means comprising the spring 48 and ball 50, mounted in the wheel 32 so as to bear rearwardly against an inner plate component 52 of frontal housing 20 and enter a slot 54 of the latter, the plate 52 having a large central aperture to permit the passage of light rays relating to the photographic exposure. A similar slot (not shown) is to be understood as located at the right-hand side of the plate 52 diametrically opposite the slot shown, for entrance of the ball 50 thereinto upon completing the 180° rotation of the wheel. The slots 54 are so formed as to prevent overriding of the ball and thereby serve additionally as limit stop means. In turning the handle 47 through 180°, it will be apparent that the disk 46 is rotated, in its own plane, so as, alternately, to cover either the lower half or the upper half of the lens-aperture. In so doing, it, of course, permits the entrance of light rays to the camera objective only through the upper or lower halves of the lens-aperture which are not thus obstructed or blocked.

A facial support frame 56 is mounted for translational acutely angular movement at the front of the camera. It is composed of a substantially rigid material, light in weight, as, for example, a clear acrylic plastic such as that known as "Plexiglas," sold by Rohm & Haas, Philadelphia, Pa., U.S.A. The mounting means includes an elongated guide or track 58 which is disposed at a suitable angle to the horizontal, e.g., at 21° relative thereto, and attached to the camera through the instrumentality of a metallic adapter plate 60, fastened to the front of the lower retaining plate 26 by a plurality of screws 62, the guide being attached to the adapter plate by two screws 64 (one shown), and by an elongated slide member 66, adapted to slidable movement longitudinally of the guide. One of the guide 58 and slide member 66 is preferably composed of a plastic material, and the other of a metallic material to facilitate the slidable relation therebetween. Thus, for example, the guide 58 may be formed of a plastic such as the acetal "Delrin," previously mentioned, and the slide 66 may, suitably, be composed of a metal, e.g., a cold-rolled steel. The support frame 56 is fixedly attached to the slide member 66, as by a plurality of rivets or screws 68.

The facial support frame 56 is interlocked with the wheel 32 through the medium of a metallic link 70 comprising a linear portion 70a and a curved portion 70b. The link is pivotally connected to wheel 32 by a stud 72 and to a boss of the support frame 56 by a second stud 74. Accordingly, manual rotation of the wheel 32 by means of the handle 47, to the limits established by the detent slots 54, causes the support frame 56 to move along the angular path established by movement of the slide 66 in the guide 58. During such movement, the support frame 56 remains level, that is, the lower wall 56a which includes the nose-piece 56a¹ and the cheek-bone contacting surfaces 56a², and the upper wall 56b which includes the forehead contacting surface 56b¹ are maintained in a horizontal disposition.

Assuming the head of the subject to be positioned as shown in FIG. 2, it will be understood that the subject is preliminarily instructed to relax and allow the head to move compliantly with movement of the support frame 56. Alternatively, the subject may remove the head from the support frame prior to its movement from the first position and reestablish contact therewith when movement to the second position has been completed. During these operations, the camera may either be hand-held, as by the pistol-grip 12, or mounted on an adjustable support 76.

The positions of left and right eyes, applicable to the two functional locations of the support frame, and the accompanying positions of the disk 46 are illustrated in FIG. 3 in which the viewing direction is to be taken as from in front of the camera looking toward the rear thereof. Position 1 of FIG. 3 is similar to that of the apparatus positioned as in FIGURE 1. The left eye is aligned with the open or unblocked upper half of the lens-aperture. Position 2 of FIG. 3 represents the location of the support frame 56 which would be achieved upon rotation of the wheel 32 180° in a clockwise direction, thus producing movement of the support frame downwardly and to the left, the right eye thereby being brought into alignment with the open lower half of the lens-aperture. As will be understood, a photographic exposure is performed by squeezing the shutter-release trigger 14 at each of the aforesaid positions 1 and 2 of FIG. 3. To facilitate correct vertical positioning of the eyes, one or a pair of sighting beads 78 is provided at given vertical portions of the support frame.

The locations of the left- and right-eye images in the finished photographic print, produced by the aforementioned processing means, is indicated in the composite print 80 of FIG. 4. It is to be noted therein that the longer dimension of each eye is disposed in accordance with the long dimension of the half-print portion in which it is located. This dimensional relationship, namely, that of providing maximum room within the print for positioning the image, permits the utmost possible latitude in positioning the eyes of the subject properly with respect to each half of the lens-aperture to obtain a correct framing thereof. In so doing, it takes cognizance of the differential facial characteristics existing between individuals. By way of example, a possible field size for each eye at the distance provided by the support frame 56 may be taken as approximately $15/16$ inch by $17/16$ inches. A related image area of the print may suitably measure $1 7/8$ inches by $2 7/8$ inches.

No attempt has been made in the diagrammatic representation of the photographic images of FIG. 4 to show the contact lenses or the fluorescein patterns which would be reproduced in the actual photographic print and utilized for clinical interpretation purposes. Components relating to illumination of the subject and to the conversion of invisible radiation to visible light are, of course, essential to effect the photographic exposure. They may thus be considered as at least closely related to, or as integral elements of the camera apparatus of the invention. These elements include a circular electronic flashtube or ring-light described in U.S. Patent No. 3,330,193 of a type containing an inert xenon gas and producing a flash of approximately 1/500 second duration, mounted within the section 10b, so as to substantially encircle the forward portion of mounting means for the lens assembly at 23; an annular filter 84 adapted to transmit ultraviolet mounted in the circular aperture or window formed between the rim 35 and the band 40 of the wheel 32 so as to intercept light rays from the flashtube passing through the annular aperture of frontal housing 20; and a filter (not shown) adapted to absorb ultraviolet and positioned in the lens-aperture at any convenient location to intercept rays from the activated fluorescein. The ultraviolet transmitting filter 84 may, appropriately, be of a type having a C.S. number 7–59 transmitting approximately 82% of the ultraviolet at a wavelength of 365 millimicrons. The ultraviolet absorbing filter positioned within the lens-aperture is, preferably, a "Wratten G. Filter (No. 15)," sold by Eastman Kodak Co., Rochester, N.Y., U.S.A.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:
1. Camera apparatus for use in the fitting of a corneal contact lens to a human eye which has been treated with fluorescein, comprising a housing of generally rectangular cross-section, an objective of given fixed focal characteristics mounted in an aperture formed in frontal portions of said housing, an ultraviolet-absorbing filter mounted in said aperture, electronic flash means including an associated ultraviolet-transmitting filter, means for exposing a film unit of given dimensions located at a focal plane predeterminedly spaced from said objective, retaining means attached to the front of said housing having a curved channel formed therein, a rotatable wheel element including in integral relation a circular flange extending substantially around its periphery mounted for rotation in said curved channel, a circular rim, an actuating handle attached to said rim, a median ring suspended from and concentric with said rim to provide therewith an annular opening for mounting said ultraviolet-transmitting filter, an inner ring suspended from and concentric with said median ring and having an opaque semi-circular disk covering one-half of its aperture, said inner ring and disk being optically aligned with said objective aperture, detent means establishing the extent of rotational movement of said wheel element to two given positions, an elongated guide located forwardly of said housing and attached at a given acute angle to said channeled retaining means, a slide member mounted for slidable movement in said guide, a facial supporting frame fixedly attached to said slide member so as to undergo translational movement therewith, said supporting frame being adapted to contact given facial areas of the subject so as both to space the eyes a given distance from said objective and to sequentially position each eye in front of an opposite half of said inner ring, and linkage means interconnecting said wheel member and said supporting frame, whereby, when said wheel member is rotated by said handle to said two positions thereby rotating said integral disk, said supporting frame is moved translationally sideways to bring each eye of the subject, treated with fluorescein and having a contact lens applied thereto, sequentially to optical alignment with the uncovered half of said inner ring, the sequential photographing of the eyes providing a composite photographic print wherein each eye and the degree of contiguity of the contact lens therewith are reproduced in a respective related upper or lower half of the print, the long dimension of the eye conforming to the long dimension of that half of the print utilized therefor in each instance.

2. Camera apparatus, as defined in claim 1, wherein the characteristics of said objective, taken with the given spacing of both said focal plane and the eyes of the subject therefrom, provide a 2× magnification of said eyes in the photographic print.

3. Camera apparatus, as defined in claim 1, wherein are provided, in a rear portion of said housing, compressive processing means for releasing and spreading a processing liquid within predetermined layers of said film unit after its photographic exposure.

4. Camera apparatus, as defined in claim 1, wherein said electronic flash means is a circular flashtube substantially surrounding said objective aperture, said annular opening mounting said ultraviolet-filter being optically aligned therewith.

5. Camera apparatus, as defined in claim 1, wherein said channeled retaining means is in the form of a pair of plate members attached in laterally-spaced relation to the front of the housing, each having an arcual channel formed therein for rotatably mounting said circular flange of the wheel member.

6. Camera apparatus, as defined in claim 5, wherein said electronic flash means is a circular flashtube substantially surrounding said objective aperture, and wherein said plate members are fastened to an individual intermediate housing releasably attached to the front of said camera housing, said individual housing including means providing a central aperture aligned with said objective aperture and an annular aperture surrounding said central aperture which is aligned with said circular flashtube.

7. Camera apparatus, as defined in claim 6, wherein said individual housing includes means providing a pair of fixed recessed components of said detent means, spaced 180° part, adapted to be engaged by a projecting, spring-biased detent component mounted on said wheel element.

8. Camera apparatus, as defined in claim 1, wherein said facial supporting frame comprises portions adapted to engage the cheek, nose, and forehead of the subject, and is so attached to said slide member as to maintain a level horizontal disposition throughout angular movement of said slide member.

9. Camera apparatus, as defined in claim 1, wherein said wheel element is composed of a dull-finished plastic material, said guide is composed of an opaque plastic material, said slide member is composed of a metal, and said supporting frame is composed of a light-transmitting plastic material.

10. Camera apparatus, as defined in claim 1, wherein said apparatus is mounted on an adjustable supporting stand for accommodating to the position of said subject.

11. Camera apparatus for use in the fitting of a corneal contact lens to a human eye which has been treated with fluorescein, comprising a housing of generally rectangular cross-section, an objective of given focal characteristics mounted in an aperture formed in frontal portions of said housing, an ultraviolet-absorbing filter mounted in said aperture, a circular electronic flash element mounted in frontal portions of said housing so as to substantially surround said aperture mounting said objective, means providing a focal plane within rear portions of said housing at a given fixed distance from the nodal point of said objective, means for exposing a film unit of given dimensions located at said focal plane, a housing element attached to the front of said camera housing having formed therewithin and passing therethrough an annular aperture adapted to extend forwardly from said circular flash element and a central aperture adapted to provide a forward extension of said aperture mounting said objective, a pair of retaining plates attached to the front of said housing element each having an arcual channel formed inwardly of an edge thereof, said retaining plates being spaced apart to form a partially circular recess, a rotatable wheel element positioned within said recess and including in integral relation a circular flange extending substantially around its periphery mounted for rotation in said arcual channels, a frontal circular rim, an actuating handle attached to said rim, a median ring suspended inwardly from and concentric with said rim to provide therewith an annular opening for optical alignment with said annular aperture of said housing element, an ultraviolet-transmitting filter mounted in said annular opening, an inner ring suspended from and concentric with said median ring, and an opaque semi-circular disk covering one-half of the aperture of said inner ring, said inner ring and disk being optically aligned with said central aperture of the housing element, detent means establishing the extent of rotational movement of said wheel element to two given positions, an elongated guide attached at a given acute angle to an adapter fastened to one of said retaining plates, a slide member mounted for slidable movement in said guide, a facial supporting frame fixedly attached to said slide member so as to undergo translational movement therewith, said supporting frame being adapted to contact given facial areas of the subject so as to space the eyes a given distance from the nodal point of said objective and to sequentially position each eye in front of an opposite half of said central aperture coincident with the uncovering thereof through rotation of said semi-circular disk, and linkage means interconnecting said wheel member and said supporting frame, whereby, when said wheel member is rotated by said handle to said two positions thereby rotating said integral disk, said supporting frame is moved translationally to bring each eye of the subject, treated with fluorescein and having a contact lens applied thereto, sequentially to optical alignment with an uncovered half of said central aperture, the sequential photographing of the eyes providing a composite photographic print wherein each eye and the degree of contiguity of the contact lens therewith are reproduced in a respective related upper or lower half of the print, the long dimension of the eye conforming to the long dimension of that half of the print utilized therefor in each instance.

12. Apparatus for use with a camera in the fitting of a corneal contact lens to a human eye which has been treated with a fluorescent substance, the camera including a housing, an objective of given fixed focal characteristics having an associated ultraviolet-absorbing filter, shutter and diaphragm exposure means, and electronic flash means having an associated ultraviolet-transmitting filter, said apparatus comprising retaining means attached to the front of said housing having a curved channel formed therein, a rotatable wheel element including in integral relation a circular flange extending substantially around its periphery mounted for rotation in said curved channel, a circular rim, an actuating handle attached to said rim, a median ring suspended from and concentric with said rim to provide therewith an annular opening for mounting said ultraviolet-transmitting filter, an inner ring suspended from and concentric with said median ring and having an opaque semi-circular disk covering one-half of its aperture, said inner ring and disk being optically aligned with said objective, detent means establishing the extent of rotational movement of said wheel element to two given positions, an elongated guide located forwardly of said housing and attached at a given acute angle to said channeled retaining means, a slide member mounted for slidable movement in said guide, a facial supporting frame fixedly attached to said slide member so as to undergo translational movement therewith, said supporting frame being adapted to contact given facial areas of the subject so as both to space the eyes a given distance from said objective and to sequentially position each eye in front of an opposite half of said inner ring, and linkage means interconnecting said wheel member and said supporting frame, whereby, when said wheel member is rotated by said handle to said two positions thereby rotating said integral disk, said supporting frame is moved translationally sideways to bring each eye of the subject, treated with said fluorescent substance and having a contact lens applied thereto, sequentially to optical alignment with the uncovered half of said inner ring, the sequential photographing of the eyes providing a composite photographic print wherein each eye and the degree of contiguity of the contact lens therewith are reproduced in a respective related upper or lower half of the print, the long dimension of the eye conforming to the long dimension of that half of the print utilized therefor in each instance.

References Cited

UNITED STATES PATENTS

| | | | |
|---|---|---|---|
| 3,108,523 | 10/1963 | Nuchman et al. | 95—11 |
| 3,196,453 | 7/1965 | Taylor | 95—11 XR |
| 3,330,193 | 7/1967 | Kaess | 95—11 |

NORTON ANSHER, Primary Examiner

F. L. BRAUN, Assistant Examiner